(12) United States Patent
Lado et al.

(10) Patent No.: US 8,862,297 B2
(45) Date of Patent: Oct. 14, 2014

(54) ENHANCED METHOD FOR CHOOSING OPTIMAL ENGINE SPEED AND TORQUE

(75) Inventors: Samantha Victoria Lado, Pittsfield Township, MI (US); Anthony H. Heap, Ann Arbor, MI (US); Wilfried Brunssen, Ypsilanti, MI (US); Michael Glenn Diaz, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 82 days.

(21) Appl. No.: 13/571,301

(22) Filed: Aug. 9, 2012

(65) Prior Publication Data

US 2014/0046523 A1  Feb. 13, 2014

(51) Int. Cl.
 *B60K 17/06* (2006.01)
(52) U.S. Cl.
 USPC .......................................................... 701/22
(58) Field of Classification Search
 USPC ........................................................ 701/22, 54
 See application file for complete search history.

(56) References Cited

U.S. PATENT DOCUMENTS

| 2005/0182546 A1* | 8/2005 | Hsieh et al. ........................ 701/54 |
| 2007/0078580 A1* | 4/2007 | Cawthorne et al. ............. 701/51 |
| 2009/0118949 A1* | 5/2009 | Heap et al. ........................ 701/55 |

* cited by examiner

*Primary Examiner* — Mary Cheung
*Assistant Examiner* — Yuen Wong

(57) ABSTRACT

A method for determining a preferred engine speed and a preferred engine torque of a selected operating range state of an electro-mechanical multi-mode transmission configured to transfer torque among an engine, at least one electric machine and a drive includes selecting between of a first search window and a second search window. Each of the first and second search windows includes a two-dimensional search window definable by a first axis having minimum and maximum engine speed values and a second axis having minimum and maximum engine torque values. A plurality of candidate operating points within the selected one of the first and second search windows is iteratively generated. One of the plurality of candidate operating points within the selected one of the first and second search windows is iteratively determined as an optimum operating point.

15 Claims, 5 Drawing Sheets

ENHANCED METHOD FOR CHOOSING OPTIMAL ENGINE SPEED AND TORQUE

TECHNICAL FIELD

This disclosure is related to multi-mode powertrain systems employing multiple torque-generative devices, and dynamic system controls associated therewith.

BACKGROUND

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion electric machines. The non-combustion electric machines may include electric machines that are operative as motors or generators to generate a torque input to the transmission independently of a torque input from the internal combustion engine. The electric machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Known transmission devices employ torque-transfer clutch devices to transfer torque between the engine, the electric machines and the driveline. Operation of a powertrain system includes activating and deactivating the clutches to effect operation in selected operating states.

SUMMARY

A method for determining a preferred engine speed and a preferred engine torque of a selected operating range state of an electro-mechanical multi-mode transmission configured to transfer torque among an engine, at least one electric machine and a drive includes selecting between of a first search window and a second search window. Each of the first and second search windows includes a two-dimensional search window definable by a first axis having minimum and maximum engine speed values and a second axis having minimum and maximum engine torque values. A plurality of candidate operating points within the selected one of the first and second search windows is iteratively generated. One of the plurality of candidate operating points within the selected one of the first and second search windows is iteratively determined as an optimum operating point.

BRIEF DESCRIPTION OF THE DRAWINGS

One or more embodiments will now be described, by way of example, with reference to the accompanying drawings, in which.

DETAILED DESCRIPTION

Figure 1:
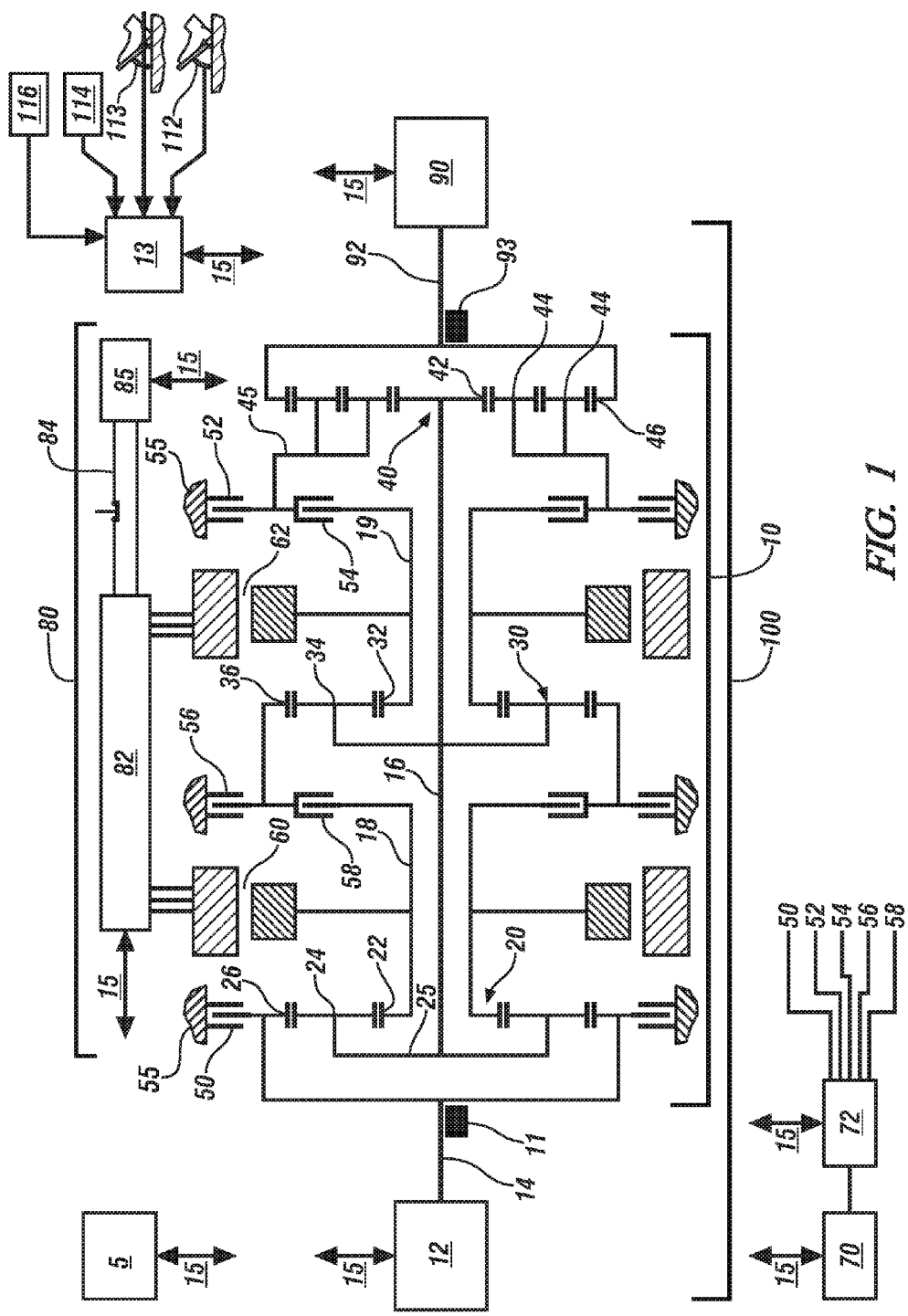
FIG. 1 illustrates a multi-mode powertrain system including an internal combustion engine, transmission, driveline, and a controller, in accordance with the present disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode electro-mechanical transmission (transmission) 10, a high-voltage electrical system 80, a driveline 90, and a control module 5. The transmission 10 mechanically couples to the engine 12 and first and second electric machines 60, 62, respectively, and is configured to transfer torque between the engine 12, the electric machines 60, 62, and the driveline 90. As illustrated, the first and second electric machines 60, 62 are electric motor/generators.

The high-voltage electrical system 80 includes an electrical energy storage device (ESD) 85 electrically coupled to a transmission power inverter control module (TPIM) 82 via a high-voltage electrical bus 84, and is configured with suitable devices for monitoring electric power flow including devices and systems for monitoring electric current and voltage. The ESD 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., rotational speed multiplied by engine torque, can differ from the input speed and the input torque to the transmission 10 due to placement of torque-consuming components on the input member 14 between the engine 12 and the transmission 10, e.g., a torque management device. The engine 12 is configured to execute autostop and autostart operations during ongoing powertrain operation in response to operating conditions. The control module 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second electric machines 60, 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second electric machines 60, 62, respectively. The transmission 10 is configured to transfer torque between the engine 12, the electric machines 60, 62, and the output member 92 in response to an output torque request. The first and second electric machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the control module 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the control module 5 to activate and deactivate the aforementioned clutches, provide hydraulic fluid for cooling and lubricating elements of the transmission, and provide hydraulic fluid for cooling the first and second electric machines 60 and 62. Hydraulic pressure in the hydraulic circuit 72 may be determined by measurement using pressure sensor(s), by estimation using on-board routines, or using other suitable methods.

The first and second electric machines 60, 62, respectively, are three-phase AC motor/generator machines, each including a stator, a rotor, and a resolver. The motor stator for each of the electric machines 60, 62 is grounded to an outer portion of the transmission case 55, and includes a stator core with coiled electrical windings extending therefrom. The rotor for the first electric machine 60 is supported on a hub plate gear that mechanically attaches to sleeve shaft 18 that couples to the first planetary gear set 20. The rotor for the second electric machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second electric machines 60, 62, respectively. Additionally, the signals output from the resolvers may be used to determine rotational speeds for first and second electric machines 60, 62, respectively.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second electric machines 60, 62, respectively, are generated as a result of energy conversion from fuel or electrical potential stored in the ESD 85. The ESD 85 is high voltage DC-coupled to the TPIM 82 via the high-voltage electrical bus 84 that preferably includes a contactor switch that permits or prohibits flow of electric current between the ESD 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 85 to AC power for powering respective ones of the first and second electric machines 60, 62, respectively, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 60, 62, respectively, for operation as motors or generators via transfer conductors. The TPIM 82 transfers electrical power to and from the first and second electric machines 60, 62, respectively, through the power inverters and respective motor control modules in response to the motor torque commands. Electrical current is transmitted across the high-voltage electrical bus 84 to and from the ESD 85 to charge and discharge the ESD 85.

The control module 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of ESD 85 and the first and second electric machines 60, 62, respectively. The control module 5 is a subset of an overall vehicle control architecture, and provides coordinated system control of the powertrain system. The control module 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of transmission ranges and engine states to generate and transfer torque to the driveline 90. The engine states include an on state, an off state, and a fuel cutoff state. When the engine operates in the off state, it is unfueled, not firing, and is not spinning. When the engine operates in the on state it is fueled, firing, and spinning. When the engine operates in the fuel cutoff state, it is spinning but is unfueled and not firing. The transmission ranges include a plurality of neutral (neutral), fixed gear (Gear #), variable mode (EVT Mode #), electric vehicle (EV#) and transitional (EV Transitional State# and Pseudo-gear #) ranges that are achieved by selectively activating the clutches C1 150, C2 152, C3 154, C4 156, and C5 158. A pseudo-gear range is a variable mode transmission range in which torque output from the transmission 10 corresponds to the input torque from the engine 12, taking into account torque losses associated with torque-consuming components on the input member 14. The pseudo-gear ranges are primarily employed as intermediate transmission ranges during shifts between EVT Mode ranges. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | on/off | | | | | |
| Neutral 2 | on/off | | | x | | |
| Neutral 3 | on/off | | | | x | |
| PseudoGear 1 | on/off | x | | | | |
| PseudoGear 2 | on/off | | x | | | |
| Neutral | off | | | | | x |
| EVT Mode 1 | on/off | x | | x | | |
| EVT Mode 2 | on/off | x | | | x | |
| EVT Mode 3 | on/off | | x | | x | |
| EVT Mode 4 | on/off | | | x | x | |
| EV Transitional State 1 | off | x | | | | x |
| EV Transitional State 2 | off | | x | | | x |
| Gear 1 | on | x | | x | x | |
| Gear 2 | on | x | x | | x | |
| Gear 3 | on | | x | x | x | |
| EV1 | off | x | | x | | x |
| EV2 | off | x | | | x | x |
| EV3 | off | | x | | x | x |
| EV4 | off | | | x | x | x |
| EV Transitional State 3 | off | x | x | | | x |
| Neutral | on/off | | | | x | x |

TABLE 1-continued

| Range | Engine State | C1 | C2 | C3 | C4 | C5 |
|---|---|---|---|---|---|---|
| PseudoGear 3 | on/off | x | x | | | |
| Neutral | off | | | x | | x |
| Neutral | off | | | | x | x |

Figure 2:
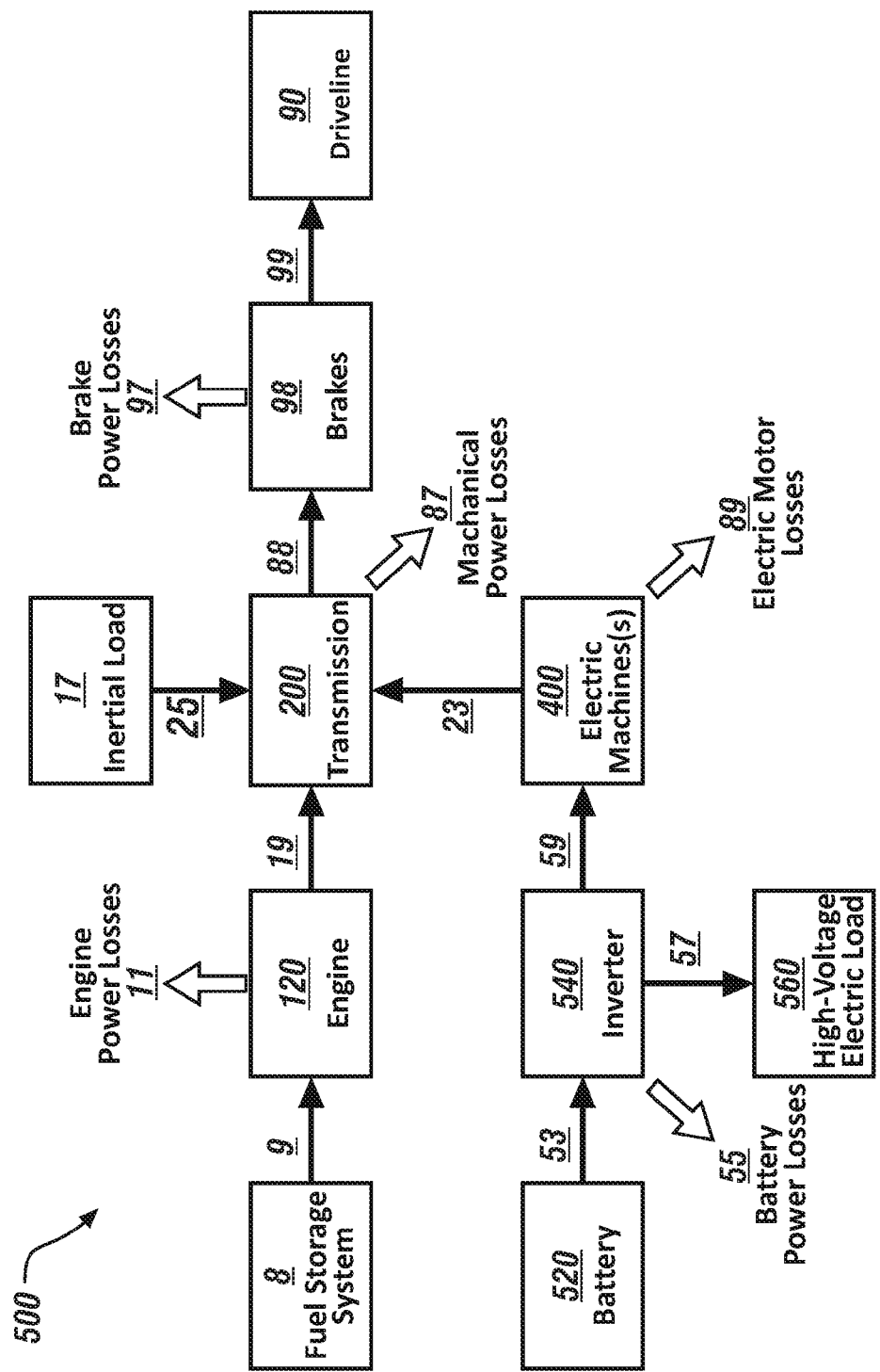
FIG. 2 illustrates an analytic framework for determining powertrain system operating costs for an exemplary power cost function 500, which is described with reference to the multi-mode powertrain system 100 of FIG. 1, in accordance with the present disclosure.

FIG. 2 schematically illustrates an analytic framework for determining powertrain system operating costs for an exemplary power cost function 500, which is described with reference to the multi-mode powertrain system 100 described with reference to FIG. 1. Powertrain elements include engine 120, transmission 200, non-combustion electric machine(s) 400, battery 520, inverter 540, wheel brakes 98, driveline 90, and a fuel storage system 8. Pseudo-elements include an inertial load 17, which is an element constructed to account for system inertias, and high-voltage electrical load 560, which is an element constructed to account for high-voltage loads in the vehicle outside that load used for the powertrain system 100. Power flow paths include a first power flow path 9 from the fuel storage system 8 to transfer fuel power to the engine 120, a second power flow path 19 between the engine 120 and the transmission 200, a third power flow path 53 between the battery 520 and the inverter 540, a fourth power flow path 57 between the inverter 540 and the high-voltage electrical load 560, a fifth power flow path 59 between the inverter 540 and the non-combustion electric machine(s) 400, a sixth power flow path 23 between the non-combustion electric machine(s) 400 and the transmission 20, a seventh power flow path 25 between the inertial load 17 and the transmission 200, an eighth power flow path 88 the transmission 200 and the wheel brakes 98, and a ninth power flow path 99 between the wheel brakes 98 and the driveline 90. Power losses include engine power losses 11, battery power losses 55, mechanical power losses 87, electric motor losses 89, and brake power losses 97. A total power cost can include a sum of the engine power losses 11, the battery power losses 55, the mechanical power losses 87, electric motor losses 89 and brake power losses 97. The power cost inputs to the power cost function 500 are determined based upon factors related to vehicle drivability, fuel economy, emissions, and battery usage. Power costs are assigned and associated with fuel and electrical power consumption and are associated with a specific operating points of the multi-mode powertrain. Lower operating costs can be associated with lower fuel consumption at high conversion efficiencies, lower battery power usage, and lower emissions for each engine speed/load operating point, and take into account the candidate operating state of the engine 14. The power costs may include the engine power losses 11, electric motor power losses 89, battery power losses 55, brake power losses 97, and mechanical power losses 87 associated with operating the multi-mode powertrain at specific operating points for the engine 100 and the non-combustion electric machine(s) 400. Subjective costs can be monitored to include, but not limited to, torque request costs, battery state of charge costs and output speed costs. The power cost function 500 may be employed to determine a total cost for operating at a selected engine operating point over the range of engine operation. Accordingly, a total cost can include the sum of the subjective costs, engine power losses 11, the battery power losses 55, the mechanical power losses 87, the electric motor losses 89, and the brake power losses 97 at any given operating range state.

Figure 3:
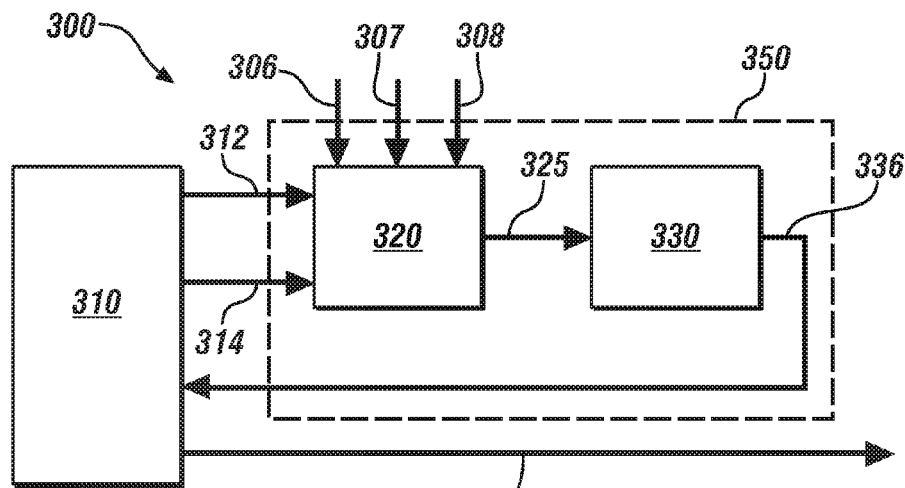
FIG. 3 illustrates a search scheme 300 employing a search module 310 for determining a preferred engine speed and a preferred engine torque output when operating the powertrain system 100 of FIG. 1 in response to an output torque request with the transmission in a selected range, in accordance with the present disclosure.

FIG. 3 illustrates a search scheme 300 employing a search module 310 for determining a preferred engine speed Ne* 352 and a preferred engine torque output Te* 354 when operating the powertrain system 100 in response to an output torque request 306 with the transmission 10 in a selected range 307, in accordance with the present disclosure. The search scheme 300 also generates a cost P* 356 associated with the preferred engine speed Ne* 352 and the preferred engine torque output Te* 354.

The search module 310 iteratively generates a plurality of candidate engine speeds Ne(j) 312 and a plurality of candidate engine torques T(j) 314, each of which is input to an iteration loop 350. The iteration loop 350 employs a system torque optimization scheme 320, and a power cost model 330 to calculate a candidate cost Pcost(j) 336 for each candidate engine speed Ne(j) 312 and each candidate engine torque T(j) 314. The search module 310 monitors the candidate costs Pcost(j) 336 for all iterations. The candidate engine speed Ne(j) 312 and candidate engine torque Te(j) 314 that achieves a minimum cost is selected by the search module 310 as the preferred engine speed Ne* 352 and preferred engine torque Te* 354. The preferred engine speed Ne* 352, preferred engine torque Te* 354, and corresponding cost P* 356 are identified based upon execution of a plurality of iteration loops across a selected speed/torque window 408 described with reference to FIG. 4.

The system torque optimization scheme 320 employs the candidate engine speed Ne(j) 312, the candidate engine torque T(j) 314, an output torque request 306, transmission range 307, and powertrain system operating parameters 308 to determine an optimized candidate powertrain operating point 325 for operating in one of the transmission ranges. The transmission range 307 is a selected one of the transmission ranges described with reference to Table 1 for one embodiment of the powertrain system 100. The powertrain system operating parameters 308 include operating limits for the first and second electric machines 60, 62, e.g., minimum and maximum torques and minimum and maximum speeds, and operating limits for the battery 85, e.g., battery power limits including maximum discharge limits, maximum charge limits, and a present state of charge. The optimized candidate powertrain operating point 325 includes preferred operating parameters for the first and second torque machines 60, 62, e.g., torque and speed, and preferred operating parameters for the ESD 85, e.g., battery power and a state of charge, in response to the output torque request 306 when the engine is operating at the candidate engine speed Ne(j) 312 and the candidate engine torque T(j) 314 and the transmission is operating in the selected transmission range 307. The power cost model 330 employs a cost function to determine a candidate cost P(j) 336 for operating the powertrain at the optimized candidate powertrain operating point 325. An exemplary cost function 500 is described with reference to FIG. 2.

The search module 310 selects the preferred engine speed Ne* 352 and preferred engine torque output Te* 354 based upon the costs for all the candidate engine speeds Ne(j) 312 and candidate engine torques T(j) 314. The preferred engine speed Ne* 352 and preferred engine torque Te* 354 are the candidate engine speed Ne(j) 312 and the candidate engine torque output Te(j) 314 that result in a minimum total cost for operating the powertrain system 100 in the selected transmission range 307 in response to the output torque request 306. The preferred engine speed Ne* 352 and preferred engine torque Te* 354 can be employed to control operation of the engine 12 in the selected transmission range 307, with operation of the powertrain system 100 corresponding thereto.

Figure 4:
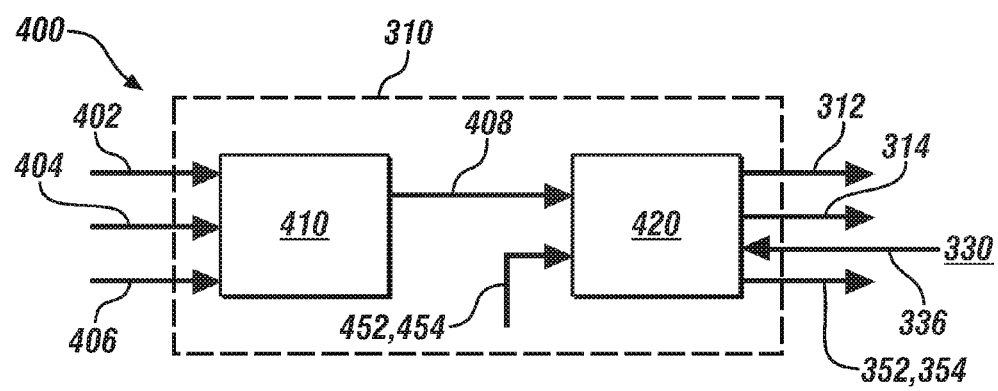
FIG. 4 illustrates the search module 310 described with reference to FIG. 3 for iteratively generating a plurality of candidate engine speeds Ne(j) and a plurality of candidate engine torques Te(j), in accordance with the present disclosure.

FIG. 4 illustrates the search module 310 described with reference to FIG. 3 for iteratively generating the plurality of candidate engine speeds Ne(j) 312 and the plurality of candidate engine torques T(j) 314, in accordance with the present disclosure. The search module 310 includes a window selection module 410 and a search engine 420. The window selection module 410 selects a speed/torque window (e.g., selected speed/torque window 408) that is input to the search engine 420. The selected speed/torque window 408 can include a first search window, e.g., global speed/torque window (FIG. 5), and a second search window, e.g., narrowed speed/torque window (FIG. 6). The window selection module 410 can select between one of the first search window and the second search window based on at least one window selection parameter including a transmission output torque 402, transmission output speed 404 and elapsed time 406. The selected speed/torque window 408 is input to the search engine 420.

In an exemplary embodiment, the search engine 420 is a two-dimensional search engine configured to iteratively generate the plurality of candidate engine speeds Ne(j) 312 and the plurality of candidate engine torques T(j) 314 based on the selected speed/torque window 408 and at least one of a previously preferred engine speed $Ne_{n-1}^*$ 452 from the immediately previous iteration and a previously preferred engine torque $Te_{n-1}^*$ 454 from the immediately previous iteration. The search engine 420 is further configured to iteratively generate the preferred engine speed Ne* 352 and the preferred engine torque Te* 354 relating to the candidate engine speed Ne(j) 312 and the candidate engine torque output Te(j) 314 that result in a minimum total cost for operating the powertrain system 100 based on the candidate power cost 336.

Figure 5:
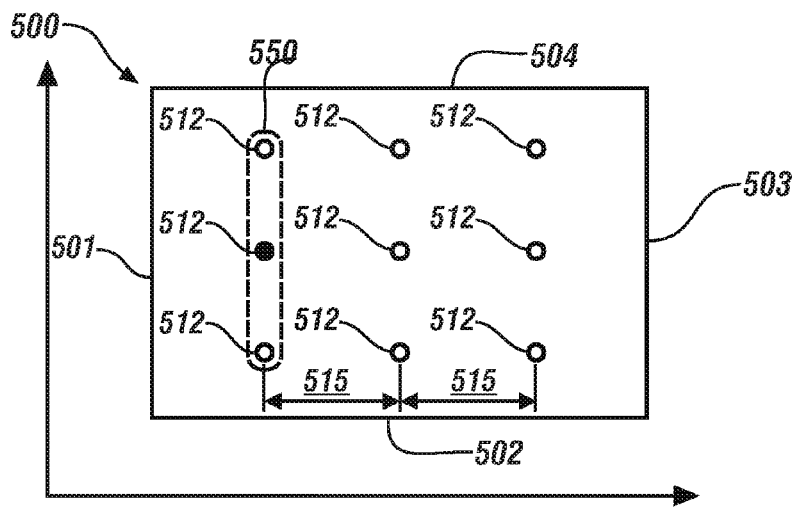
FIG. 5 illustrates the selected speed/torque window 408 of FIG. 4 representing a selected first search window, in accordance with the present disclosure.
Figure 6:
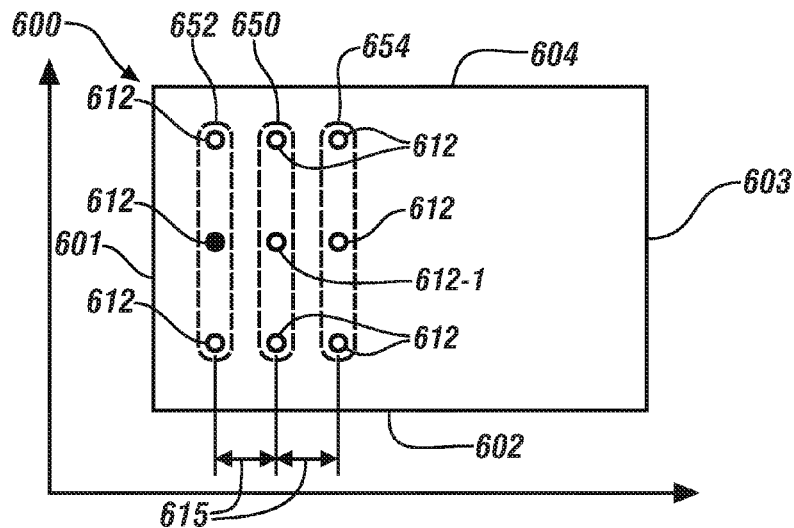
FIG. 6 illustrates the selected speed/torque window 408 of FIG. 4 representing a selected second search window, in accordance with the present disclosure.

FIG. 5 illustrates the selected speed/torque window 408 described with reference to FIG. 4 representing the first search window, in accordance with the present disclosure. The first search window 500 is represented by engine speed (RPM) along the horizontal horizontal axis and engine torque (Nm) along the vertical vertical axis. The first search window 500 is a two-dimensional search window definable by a first axis (e.g., horizontal axis) having minimum and maximum engine speed values 501, 503, respectively, and a second axis (e.g., vertical axis) having minimum and maximum engine torque values 502, 504, respectively.

The first search window 500 includes a plurality of candidate operating points 512, each candidate operating point including a candidate engine speed and a candidate engine torque. It will be appreciated that the plurality of candidate operating points 512 can correspond to the plurality of candidate engine speeds Ne(j) 312 and the plurality of candidate engine torques Te(j) 314 iteratively generated by the two-dimensional search engine 420 of FIG. 4. Distance 515 denotes a distance between each candidate operating point 512 with respect to engine speed. The shaded one of the plurality of candidate operating points 512 denotes a preferred operating point. The preferred operating point can correspond to the candidate engine speed and the candidate engine torque having a minimum cost. A first group 550 of candidate operating points including the preferred operating point is depicted. Each of the candidate operating points in the first group 550 includes an identical engine speed. Discussed in greater detail below, the first group 550 may be adaptively inserted into the second search window 600 of FIG. 6.

FIG. 6 illustrates the selected speed/torque window 408 described with reference to FIG. 4 representing the second search window, in accordance with the present disclosure. The second search window 600 is represented by engine speed (RPM) along the horizontal horizontal axis and engine torque (Nm) along the vertical vertical axis. The second search window 600 is a two-dimensional search window definable by a first axis (e.g., horizontal axis) having minimum and maximum engine speed values 601, 603, respectively, and a second axis (e.g., vertical axis) having minimum and maximum engine torque values 602, 604, respectively.

The second search window 600 includes a plurality of candidate operating points 612, each candidate operating point including a candidate engine speed and a candidate engine torque. It will be appreciated that the plurality of candidate operating points 612 can correspond to the plurality of candidate engine speeds Ne(j) 312 and the plurality of candidate engine torques Te(j) 314 iteratively generated by the two-dimensional search engine 420 of FIG. 4. Distance 615 denotes a distance between each candidate operating point 612 with respect to engine speed. The shaded one of the plurality of candidate operating points 612 denotes a preferred operating point. A first group 650 denotes adaptively inserted candidate operating points. The first group 650 includes a candidate operating point 612-1 denoting the preferred operating point from an immediately preceding iteration (i.e., shaded candidate operating point 512 of the first group 550 of FIG. 5) inserted to the second search window 600 of the current iteration. Each candidate operating point of a second group 652 is equally offset in a negative direction with respect to engine speed from the adaptively inserted first group 650 of candidate operating points. Each candidate operating point of a third group 654 of candidate operating points is equally offset in a positive direction with respect to engine speed from the adaptively inserted first group 650 of candidate operating points. Each candidate operating point of the first group 650 includes an identical engine speed, each candidate operating point of the second group 652 includes an identical engine speed and each candidate operating point of the third group 654 includes an identical engine speed. It will be appreciated that if the second search window 600 is selected during an immediately subsequent iteration, the second group 652 including the preferred operating point (e.g., shaded) 612 will be adaptively inserted to the second search window 600 of the immediately subsequent iteration.

In an exemplary embodiment, the first search window 500 is a global search window encompassing an entire engine speed and engine torque operating range for a selected range. The second search window 600 is an adaptive search window based on a preferred operating point from an immediately preceding time step. Accordingly, the first search window 500 includes a larger area than the area of the second search window 600. The distance 615 between each candidate operating point 612 with respect to engine speed when the second search window 600 is selected is shorter than the distance 515 between each candidate operating point 512 with respect to engine speed when the first search window 500 is selected. Thus, the second search window 600 (i.e., adaptive search window) enables narrower search capabilities after an optimum operating point is determined by the first search window 500 (i.e., global search window) or after an optimum operating point is determined by a second search window in an immediately preceding iteration. While each of the first and second search windows illustrated in FIGS. 5 and 6 depict nine (9) candidate operating points arranged in a 3×3 fashion, any number of candidate operating points can be utilized without departing from the scope of the disclosure.

Figure 7:
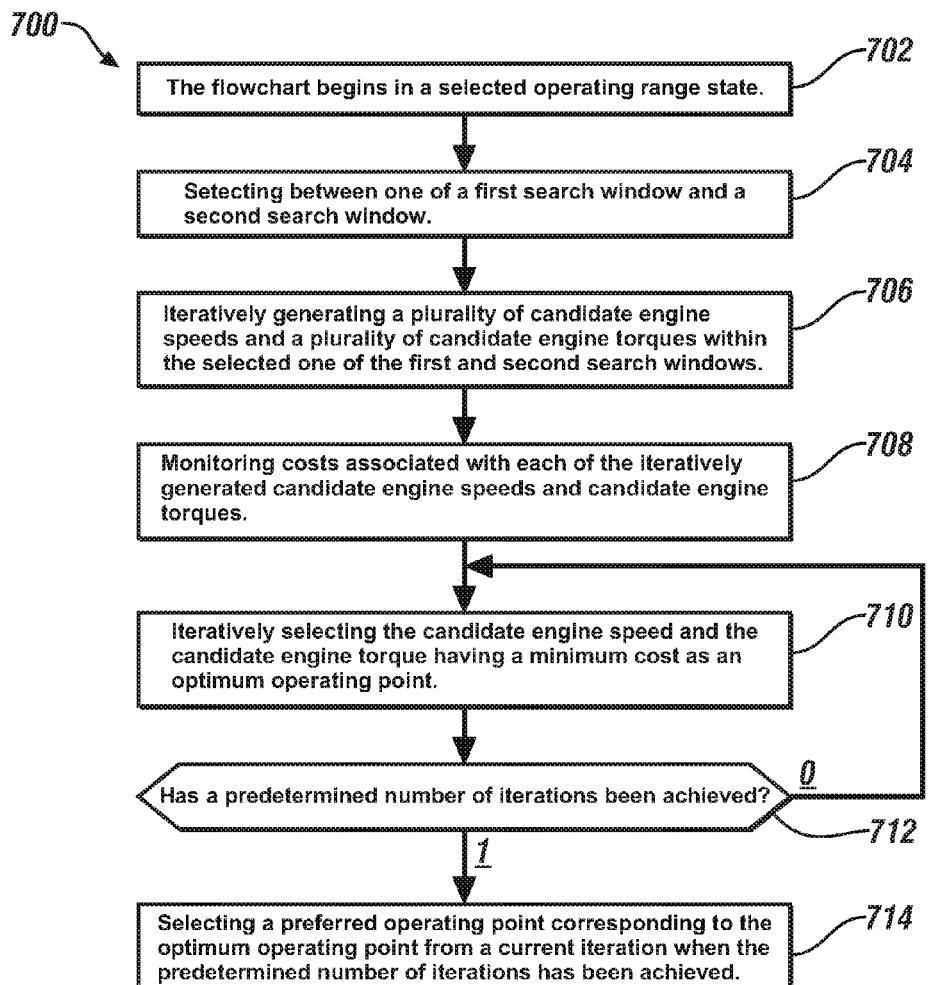
FIG. 7 illustrates an exemplary flowchart 700 for determining a preferred engine speed and a preferred engine torque of a selected operating range state described with reference to the search module 310 of FIG. 4, in accordance with the present disclosure.

FIG. 7 illustrates an exemplary flowchart 700 for determining a preferred engine speed and a preferred engine torque of a selected operating range state, in accordance with the present disclosure. The flowchart 700 is described with reference to the search module 310 of FIGS. 3 and 4 and the first and second search windows 500 and 600 of FIGS. 5 and 6, respectively. The flowchart 700 can be implemented within the search module 310 of the control module. Table 2 is provided as a key to FIG. 7, wherein the numerically labeled blocks and the corresponding functions are set forth as follows.

TABLE 2

| BLOCK | BLOCK CONTENTS |
|---|---|
| 702 | The flowchart begins in a selected operating range state |
| 704 | Selecting between one of a first search window and a second search window. |
| 706 | Iteratively generating a plurality of candidate engine speeds and a plurality of candidate engine torques within the selected one of the first and second search windows. |
| 708 | Monitoring costs associated with each of the iteratively generated candidate engine speeds and candidate engine torques. |
| 710 | Iteratively selecting the candidate engine speed and the candidate engine torque having a minimum cost as an optimum operating point. |
| 712 | Has a predetermined number of iterations been achieved? |
| 714 | Selecting a preferred operating point corresponding to the optimum operating point from a current iteration when the predetermined number of iterations has been achieved. |

The flowchart 700 begins in a selected operating range state at block 702. FIG. 7 illustrates an exemplary flowchart 700 for determining a preferred engine speed and a preferred engine torque of a selected operating range state, in accordance with the present disclosure. The selected operating range state corresponds to the transmission range 307 of FIG. 3 denoting a selected one of the transmission ranges described with reference to Table 1.

Block 704 selects between one of the first search window 600 and the second search window 600 (e.g., selected speed/torque window 408 of FIG. 4). In an exemplary embodiment, the first search window 500 is selected during a first or initial time step and the second search window 600 is selected during at least a second time step unless a switching condition is detected, wherein the second time step is immediately subsequent to the first time step. Selection of the second search window may be maintained during time steps subsequent to the second time step unless a switching condition is detected. When the switching condition is detected, selection from the second search window 600 to the first search window 500 occurs.

In one embodiment, transmission output torque is monitored and the switching condition is detected when a change in the transmission output torque exceeds a torque threshold. The change in transmission output torque can be in response to an operator torque request, e.g., an operator input to the accelerator pedal 112 and monitored by the user interface 13 and the control module 5 via the communications link 15. In another embodiment, transmission output speed can be monitored and the switching condition can be detected when a change in transmission output speed exceeding a speed threshold. In yet another embodiment, an elapsed time since the first search window was last selected is monitored and the switching condition can be detected when the elapsed time exceeds a predetermined time. For instance, if a search has been performed in the second search window 600 for a period of time, it may be desirable to begin a new initial search in the first search window 500.

Block 706 iteratively generates a plurality of candidate engine speeds and a plurality of candidate engine torques within the selected one of the first and second search windows. The plurality of candidate engine speeds and the plurality of candidate engine torques correspond to Ne(j) 312 and T(j) 314, each of which is input to the iteration loop 350 of FIG. 3. The plurality of candidate engine speeds and the plurality of candidate engine torques can be represented by a plurality of candidate operating points 512 and 612 of FIGS. 5 and 6, respectively.

In an exemplary embodiment, the plurality of candidate operating points 612 within the selected second search window 600 are generated based on an optimum operating point from an immediately preceding iteration. However, the plurality of candidate operating points 612 when the first search window 500 is selected are not based on an optimum operating point from an immediately preceding iteration. For instance, and with reference to FIGS. 5 and 6, the first group 550 of candidate operating points including the optimum operating point (e.g., shaded operating point 512) is adaptively inserted into the selected second search window 600 of the current iteration and is represented by first group 650 in the second search window 600 during the current iteration. Candidate operating point 612-1 in the second search window 600 denotes the optimum operating point (i.e., shaded candidate operating point 512) from the selected first search window 500 from the immediately preceding iteration. It will be understood that FIGS. 5 and 6 are used for illustrative purposes only, and the generated plurality of candidate operating points within the second window can be based on an optimum operating point within a second search window of an immediately previous time step.

Further, at least a second group 652 of candidate operating points is generated within the second search window 600. Each candidate operating point of the second group 652 is equally offset in a negative direction with respect to engine speed from the adaptively inserted first group 650 of candidate operating points. Likewise, at least a third group 654 of candidate operating points is generated within the second search window 600. Each candidate operating point of the third group 654 is equally offset in a positive direction with respect to engine speed from the adaptively inserted first group 650 of candidate operating points.

Block 708 monitors costs associated with each of the iteratively generated candidate engine speeds and candidate engine torques (i.e., candidate operating points 512 and 612). As aforementioned, search module 310 of FIG. 3 monitors the candidate costs Pcost(j) 336 for all iterations.

Block 710 iteratively selects the candidate engine speed and the candidate engine torque having a minimum cost as an optimum operating point. In an exemplary embodiment, the optimum operating point can be monitored over a plurality of consecutive iterations when the second search window 600 is selected. A change in the optimum operating point over the plurality of consecutive iterations can be tracked in one of a negative and a positive direction with respect to engine speed and in one of a negative and a positive direction with respect to engine torque. Further, a gradient of costs associated with each of the plurality of candidate operating points over the plurality of consecutive iterations. A search direction in one of the negative and the positive direction with respect to engine speed and in one of the negative and the positive direction with respect to engine torque can be determined based on the tracked change of the optimum operating point and the determined gradient of costs over the plurality of consecutive iterations. Therefore, it will be appreciated that the search module 310 of FIG. 3 is configured to employ a direct search during an initial iteration and an adaptive search is employed during iterations subsequent to the initial iteration.

Decision block 712 determines if a predetermined number of iterations have been achieved. A "0" indicates that the predetermined number of iterations has not been achieved and the flowchart reverts back to block 710. A "1" indicates that the predetermined number of iterations has been achieved and the flowchart proceeds to block 714.

Block 714 selects a preferred operating point corresponding to the optimum operating point from a current iteration when the predetermined number of iterations has been achieved. The preferred operating point can correspond to the preferred engine speed Ne* 352 and the preferred engine torque output Te* 354 output from the search module 310 shown in FIG. 3. One will appreciate that the plurality of candidate operating points 612 within the selected second search window 600 during an initial iteration are generated based on a preferred operating point that corresponds to an optimum operating point from an immediately preceding iteration that achieved the predetermined number of iterations.

Figure 8:
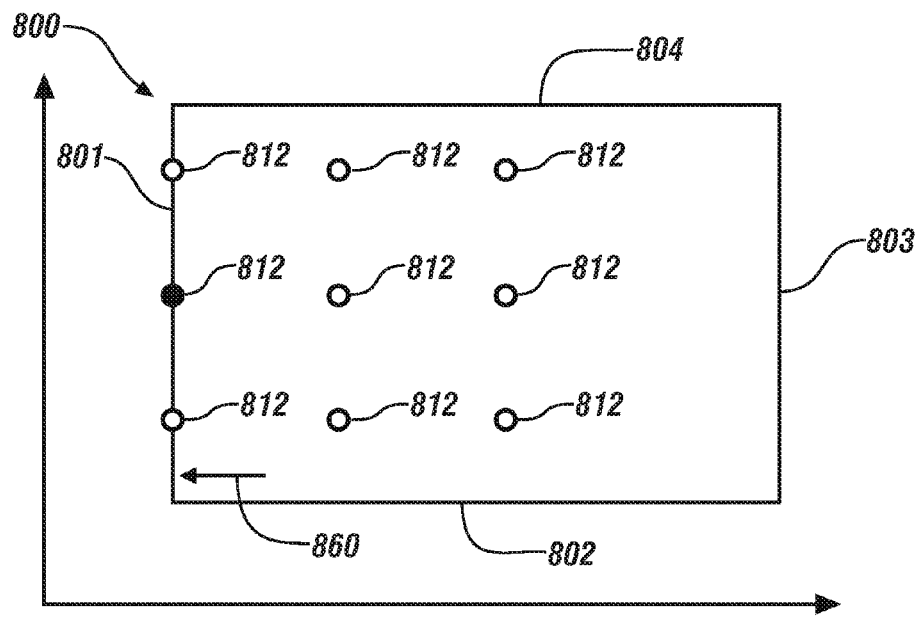
FIGS. 8 and 9 each illustrate a selected second search window illustrating a determined search direction based on a tracked change of the optimum operating point, in accordance with the present disclosure.

FIG. 8 illustrates a selected second search window 800 illustrating a determined search direction based on a tracked change of the optimum operating point, in accordance with the present disclosure. The selected second search window 800 corresponds to the second search window 600 of FIG. 6, wherein like numerals refer to like features. A search direction 860 in a negative direction with respect to engine speed is determined based on a tracked change of the preferred operating point and the determined gradient of costs over a plurality of consecutive iterations. Shaded candidate operating point 812 is the optimum operating point of the current iteration illustrated in FIG. 8. Thus, during the current iteration, the optimum operating point (e.g., shaded operating point 812) has achieved the minimum engine speed value 801. As aforementioned, an immediately subsequent iteration adaptively inserts a first group of candidate operating points including the optimum operating point (e.g., shaded operating point 812) from the immediately preceding iteration into the second search window. However, provided that the shaded operating point 812 has encountered the minimum speed value 801 in the immediately previous iteration, any generated group that is offset in a negative direction with respect to engine speed from the shaded operating point 812 of the immediately previous iteration would be outside the minimum speed value 801.

In an exemplary embodiment, at least a second group of candidate operating points is generated, each candidate operating point of the second group is equally offset in a positive direction with respect to engine speed from the adaptively inserted first group of candidate operating points. Further, at least a third group of candidate operating points are generated, each candidate operating point of the third group is equally offset in a positive direction with respect to engine speed from the second group of candidate operating points. Accordingly, the immediately subsequent iteration prevents a group of candidate operating points from being generated outside one of the minimum and maximum engine speed limits when the optimum operating point from the immediately preceding iteration encounters the one of the minimum and maximum engine speed limits. Hence, if the maximum engine speed value 803 were encountered, at least a second group of candidate operating points would be equally offset in a negative direction with respect to engine speed from an adaptively inserted first group of candidate operating points including an optimum operating point from a previous iteration. Likewise, at least a third group of candidate operating points would be equally offset in the negative direction with respect to engine speed from the second group of candidate operating points.

Figure 9:
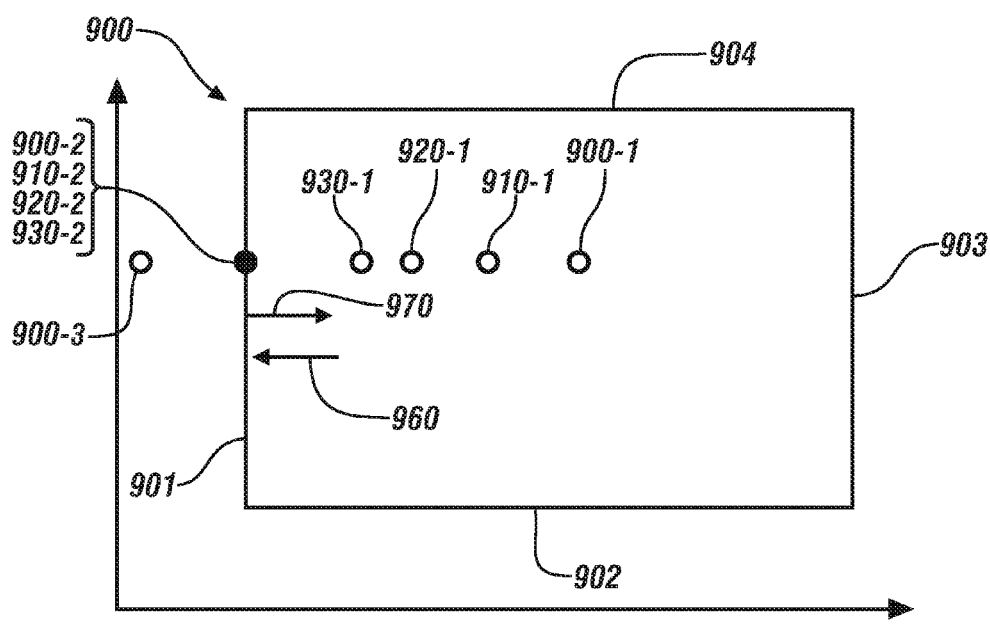

FIG. 9 illustrates a selected second search window 900 illustrating a determined search direction based on a tracked change of the optimum operating point, in accordance with the present disclosure. The second search window 900 is represented by engine speed (RPM) along the horizontal horizontal axis and engine torque (Nm) along the vertical vertical axis. The second search window 900 is a two-dimensional search window definable by a first axis (e.g., horizontal axis) having minimum and maximum engine speed values 901, 903, respectively, and a second axis (e.g., vertical axis) having minimum and maximum engine torque values 902, 904, respectively.

The selected second search window 900 includes candidate operating points 900-1 and 900-2 from a previous iteration, candidate operating points 910-1 and 910-2 from a first iteration, candidate operating points 920-1 and 920-2 from a second iteration and candidate operating points 930-1 and 930-2 from a third iteration. For simplicity, only one candidate operating point is illustrated with respect to each engine speed, however, each candidate operating point can be included within a group of candidate operating points each having an identical engine speed. A search direction 960 in a negative direction with respect to engine speed is determined based on a tracked change of the preferred operating point and the determined gradient of costs over a plurality of consecutive iterations. Likewise, a search direction in a positive direction and a negative direction with respect to engine torque can also be determined. The minimum and maximum engine speed values 801, 803, respectively, and the minimum and maximum engine torque values 802, 804, respectively, are monitored.

In an exemplary embodiment, if the determined search direction in one of the negative and the positive direction with respect to engine speed encounters one of the minimum and maximum engine speed values in an immediately preceding iteration, the determined search direction in the other one of the negative and the positive direction can be changed by a magnitude that decays during each iteration that the determined search direction encounters the one of the minimum and maximum engine speed values. Likewise, if the determined search direction in one of the negative and the positive direction with respect to engine torque encounters one of the minimum and maximum engine torque values in an immediately preceding iteration, the determined search direction in the other one of the negative and the positive direction can be changed by a magnitude that decays during each iteration that the determined search direction encounters the one of the minimum and maximum engine speed values.

In the example illustrated in FIG. 9, the determined search direction 960 encounters the minimum engine speed value 901 as denoted by the optimum operating point 900-2 of the previous iteration. Accordingly, the determined search direction is changed in the positive direction 970 by a magnitude such that the candidate operating point 901-1 of the immediately subsequent first iteration is inserted. During the first iteration, the determined search direction 960 again encounters the minimum engine speed value 901 as denoted by the optimum operating point 910-2 of the first iteration. Accordingly, the determined search direction is changed in the positive direction by a magnitude that decays such that the candidate operating point 920-1 of the immediately subsequent second iteration is inserted. During the second iteration, the determined search direction 960 again encounters the minimum engine speed value 901 as denoted by the optimum operating point 920-2 of the second iteration. Accordingly, the determined search direction is changed in the positive direction by a magnitude that decays such that the candidate operating point 930-1 of the immediately subsequent iteration is inserted. During the third iteration, the determined search direction 960 again encounters the minimum engine speed value 901 as denoted by the optimum operating point 930-2 of the second iteration. Candidate operating point 900-3 is shown for illustrative purposes only, and depicts a candidate operating point of the first iteration if changing the determined direction was not applied. Hence, candidate operating point 900-3 is undesirably outside the minimum engine speed value 901. It will be understood that changing the search direction prevents the search from saturating on the minimum engine speed value 801 and instead provides the ability to locate minima that are near the minimum engine speed value.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for determining a preferred engine speed and a preferred engine torque of a selected operating range state of an electro-mechanical multi-mode transmission configured to transfer torque among an engine, at least one electric machine and a driveline, the method comprising:
    a control module configured to execute the following steps, comprising:
        iteratively selecting between one of a first search window and a second search window, each of the first and second search windows comprising a two-dimensional search window definable by a first axis having minimum and maximum engine speed values and a second axis having minimum and maximum engine torque values;
        iteratively generating a plurality of candidate operating points within the selected one of the first and second search windows; and
        iteratively determining as an optimum operating point one of the plurality of candidate operating points within the selected one of the first and second search windows.

2. The method of claim 1 wherein the first search window comprises a larger area than an area of the second search window.

3. The method of claim 2 wherein a distance between each candidate operating point with respect to engine speed when the second search window is selected is shorter than a distance between each candidate operating point with respect to engine speed when the first search window is selected.

4. The method of claim 1 wherein each of the candidate operating points comprises a candidate engine speed and a candidate engine torque.

5. The method of claim 1 wherein selecting between one of the first search window and the second search window comprises:
    selecting the first search window during a first time step; and
    selecting the second search window during at least a second time step unless a switching condition is detected, the second time step being immediately subsequent to the first time step.

6. The method of claim 5 wherein selecting the second search window during at least the second time step comprises:
    maintaining selection of the second search window during time steps subsequent to the second time step until said switching condition is detected.

7. The method of claim 6 wherein the control module is further configured to execute the following steps, comprising:
    monitoring transmission output torque;
    detecting the switching condition when a change in the transmission output torque exceeds a torque threshold; and
    switching selection from the second search window to the first search window when the switching condition is detected.

8. The method of claim 6 wherein the control module is further configured to execute the following steps, comprising:
    monitoring transmission output speed;
    detecting the switching condition when a change in the transmission output speed exceeds a speed threshold; and
    switching selection from the second search window to the first search window when the switching condition is detected.

9. The method of claim 6 wherein the control module is further configured to execute the following steps, comprising:
    monitoring an elapsed time since the first search window was last selected;
    detecting the switching condition when the elapsed time since the first search window was last detected exceeds a predetermined time; and
    switching selection from the second search window to the first search window when the switching condition is detected.

10. The method of claim 1 wherein iteratively generating the plurality of candidate operating points within the selected one of the first and second search windows comprises:
    generating the plurality of candidate operating points within the selected second search window based on a preferred operating point from an immediately preceding iteration.

11. The method of claim 10 wherein generating the plurality of candidate operating points within the selected second search window based on the preferred operating point from the immediately preceding iteration comprises:
    adaptively inserting a first group of candidate operating points including the preferred operating point from the immediately previous iteration into the selected second search window of the current iteration, each of the candidate operating points in the first group comprising an identical engine speed;
    generating at least a second group of candidate operating points, each candidate operating point of the second group being equally offset in a negative direction with respect to engine speed from the adaptively inserted first group of candidate operating points; and
    generating at least a third group of candidate operating points equally offset in a positive direction with respect to engine speed from the adaptively inserted first group of candidate operating points.

12. The method of claim 1 wherein iteratively determining one of the plurality of candidate operating points within the selected one of the first and second search windows as the optimum operating point comprises:
    monitoring the optimum operating point over a plurality of consecutive iterations when the second search window is selected; and
    tracking a change in the optimum operating point over the plurality of iterations in one of a negative and a positive direction with respect to engine speed and in one of a negative and a positive direction with respect to engine torque.

13. The method of claim 12 wherein the control module is further configured to execute the following steps, comprising:
monitoring a cost associated with each of the plurality of candidate operating points over the plurality of consecutive iterations when the second search window is selected;
determining a gradient of costs associated with each of the plurality of candidate operating points over the plurality of consecutive iterations; and
determining a search direction in the one of the negative and the positive direction with respect to engine speed and in the one of the negative and the positive direction with respect to engine torque based on the tracked change of the preferred operating point and the determined gradient of costs over the plurality of consecutive iterations.

14. The method of claim 13 wherein the control module is further configured to execute the following steps, comprising:
monitoring the minimum and maximum engine speed values of the selected second search window;
monitoring the minimum and maximum engine torque values of the selected second search window;
if the determined search direction in the one of the negative and the positive direction with respect to engine speed encounters one of the minimum and maximum engine speed values, changing the determined search direction in the other one of the negative and the positive direction with respect to engine speed by a magnitude that decays during each iteration that the determined search direction encounters the one of the minimum and maximum engine speed values; and
if the determined search direction in the one of the negative and the positive direction with respect to engine torque encounters one of the minimum and maximum engine torque values, changing the determined search direction in the other one of the negative and the positive direction with respect to engine torque by a magnitude that decays during each iteration that the determined search direction encounters the one of the minimum and maximum engine torque values.

15. The method of claim 1 wherein the control module is further configured to execute the following steps, comprising:
selecting a preferred operating point corresponding to the optimum operating point from a current iteration when a predetermined number of iterations has been achieved.

* * * * *